United States Patent [19]
Maschmann et al.

[11] Patent Number: 5,927,724
[45] Date of Patent: Jul. 27, 1999

[54] CYLINDER HEAD GASKET

[75] Inventors: Siegfried Maschmann, Bad Urach; Kurt Schwenkel, Hulben; Armin Diez, Lenningen, all of Germany

[73] Assignee: Elring Klinger GmbH, Dettingen, Germany

[21] Appl. No.: 08/900,092

[22] Filed: Jul. 25, 1997

[30] Foreign Application Priority Data

May 8, 1997 [DE] Germany ............... 197 19 328

[51] Int. Cl.⁶ .................................. F16J 15/08
[52] U.S. Cl. ..................... 277/593; 277/591; 277/595
[58] Field of Search .................... 277/591, 593, 277/595, 594, 597, 601

[56] References Cited

U.S. PATENT DOCUMENTS

| | | | |
|---|---|---|---|
| 4,468,044 | 8/1984 | Ulmer et al. | 277/601 X |
| 4,799,695 | 1/1989 | Yoshino | 277/595 X |
| 5,161,809 | 11/1992 | Matsushita et al. | 277/601 |
| 5,197,747 | 3/1993 | Ueta et al. | 277/595 |
| 5,286,039 | 2/1994 | Kawaguchi et al. | 277/595 |
| 5,306,024 | 4/1994 | Udagawa | 277/593 X |
| 5,348,315 | 9/1994 | Kawaguchi et al. | 277/595 |
| 5,549,307 | 8/1996 | Capretta et al. | 277/595 |
| 5,560,623 | 10/1996 | Yoshino | 277/595 |
| 5,580,065 | 12/1996 | Ueta | 277/594 X |
| 5,584,490 | 12/1996 | Inoue et al. | 277/597 X |
| 5,588,657 | 12/1996 | Fujisawa et al. | 277/595 |
| 5,609,345 | 3/1997 | Miura et al. | 277/595 X |
| 5,628,518 | 5/1997 | Ushio et al. | 277/595 X |
| 5,695,200 | 12/1997 | Diez et al. | 277/593 |

FOREIGN PATENT DOCUMENTS 0 740 092 A1  10/1996  European Pat. Off. ......... F16J 15/08

*Primary Examiner*—Anthony Knight
*Assistant Examiner*—William Ackerman
*Attorney, Agent, or Firm*—Alix, Yale & Ristas, LLP

[57] ABSTRACT

A metallic cylinder head gasket with a pair of deformation limiters for protecting each sealing bead which circumscribes a gasket opening aligned with an engine cylinder. The gasket has at least a first cover plate, which includes the resilient beads, a shim and a ring member. The edge of the combination chamber aligned opening in the shim is displaced radially outwardly from the associated bead, and the bead is thus not aligned with the shim, and a ring member overlaps the shim in an annular region adjacent the edge of the opening in the shim to define an outer deformation limiter. The ring member extends radially inward to the edge of the gasket opening and has a region of increased thickness which defines the inner deformation limiter.

20 Claims, 1 Drawing Sheet

5,927,724

CYLINDER HEAD GASKET

BACKGROUND OF THE INVENTION

1. Field of the Invention

The present invention relates to the establishment of a fluid impervious seal about a space which is subject to pressure fluctuations and, particularly, to the creation of a seal between the block and cylinder head of an internal combustion engine. More specifically, this invention is directed to metallic head gaskets and, especially, to such gaskets wherein sealing about the ends of the cylinders is accomplished by means of integral resilient beads and wherein a pair of coaxial deformation limiters are provided within the gasket for each bead to prevent permanent deformation thereof. Accordingly, the general objects of the present invention are to provide novel and improved methods and articles of such character.

2. Description of the Prior Art

Metallic cylinder head gaskets are, of course, well-known in the art. Published German Patent Application 195 13 361 discloses such a gasket wherein resilient sealing beads, arranged coaxially with respect to the combustion chamber openings, are each provided with a pair of deformation limiters. The deformation limiters of each pair cooperate to prevent excessive deformation of the associated sealing bead in areas displaced both radially inwardly and radially outwardly from the bead. The provision of such inner and outer deformation limiters results in the compression of the beads in the clamped condition of the gasket being directed virtually perpendicularly with respect to the sealing plane. It has been found to be particularly advantageous to utilize such cooperating inner and outer deformation limiters when the gasket is employed on an engine having a block formed of a relatively light-weight material and cylinder liners. In such an operating environment, there is a risk of the effectiveness of the inner deformation limiter being reduced as a result of the cylinder liner subsiding, i.e., as a consequence of the operating conditions and factors such as different coefficients of thermal expansion of the head, block and liner. Under such circumstances, an unacceptable degree of deformation of the bead will be reliably prevented by the outer deformation limiter.

In the prior art, as exemplified by the above-referenced publication, the outer deformation limiters are customarily in the form of rings mounted on a carrier plate. The centering and attaching of such rings, as well as the shaping of the relatively thick carrier plates, are laborious tasks which have significantly increased gasket cost. There has, accordingly, been a long-standing desire in the art for a metallic cylinder head gasket, having inner and outer bead deformation limiters, which can be more efficiently manufactured when compared to the prior art.

SUMMARY OF THE INVENTION

The present invention overcomes the above-briefly discussed and other deficiencies and disadvantages of the prior art and, in so doing, provides a metallic cylinder head gasket comprising at least one cover plate, the cover plate being provided with integral resilient sealing beads, a shim member and a component or subassembly which defines an inner bead deformation limiter while simultaneously cooperating with the shim member to define an outer bead deformation limiter. The gasket of the present invention is characterized by being easier to manufacture than prior art gaskets suitable for the same end use.

In accordance with a preferred embodiment of the invention, the shim member is terminated by aperture defining edges located radially outwardly from and generally coaxially with respect to each bead. A "ring" member, which defines an inner deformation limiter, is caused to overlap an annular region extending radially outward from the edge of each aperture in the shim member to thereby define the outer deformation limiters. The ring member or members, in the manufacture of the gasket, are easily positioned relative to the apertures in the shim member. The requisite concentric positioning of the ring member(s) may be facilitated by providing annular deformations on both the shim member and ring member(s), i.e., by simple sheet-metal shaping. If appropriate, the overall thickness of the cylinder head gasket may be increased through the provision of a carrier plate on which the shim member and ring member(s) are supported.

BRIEF DESCRIPTION OF THE DRAWINGS

The present invention may be better understood, and its numerous objects and advantages will become apparent to those skilled in the art, by reference to the accompanying drawing wherein like reference numerals refer to like elements in the several figures and in which.

DESCRIPTION OF THE DISCLOSED EMBODIMENTS

Figure 1:
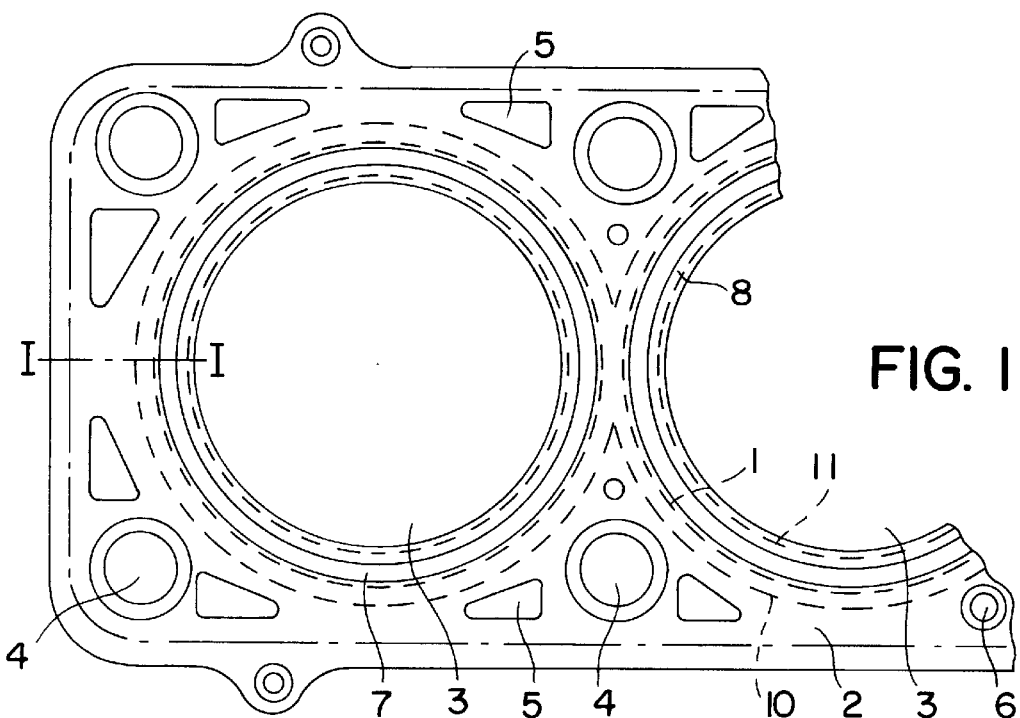
FIG. 1 is a schematic, partial top plan view of a cylinder head gasket in accordance with the present invention.
Figure 2:
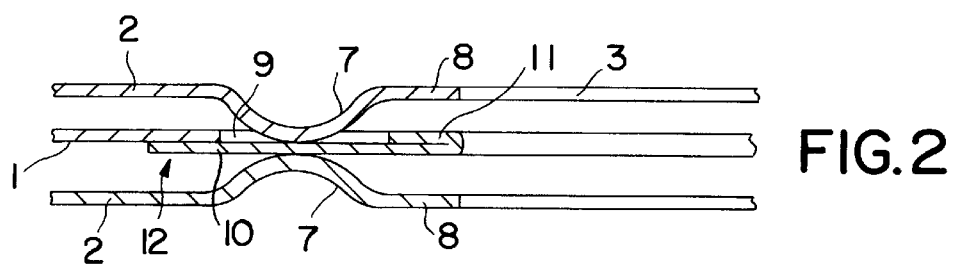
FIG. 2 is a cross-sectional side elevation view, taken along line I—I of FIG. 1, of a first embodiment of a gasket in accordance with the invention.

Referring jointly to FIGS. 1 and 2, a metallic cylinder head gasket in accordance with the present invention is defined, in part, by a thin, planar shim 1. In the embodiment being described, shim 1 is sandwiched between a pair of cover plates 2. The resilient beads 7, which perform the actual sealing function, are integral with the cover plates 2. The gasket, i.e., the shim 1 and cover plates 2, defines a series of openings 3 which are sized and spaced to correspond to the combustion spaces, i.e., the open ends of the cylinders, of an internal combustion engine. The gasket is also provided with through holes 4 for the bolts which mount the head to the engine block and thus clamp the gasket in its operating position. The gasket is also provided with openings 5 and 6 through which coolant and lubricant may flow.

The cover plates 2 will typically be fabricated from spring steel and, with the exception of the beads 7, are planar. The beads 7 will be radially offset relative to the edges of the openings 3 to thereby provide a flat annular sheet metal section 8 surrounding each opening 3. In the embodiment being described, which employs a pair of cover plates 2, the beads 7 are oppositely directed, i.e., the beads face one another and extend in the direction of the plane of shim 1.

It is to be noted that half beads will conventionally be provided around the gasket bolt openings 4 and also about the openings 6 through which oil will flow. Half beads may also be provided around the coolant flow openings 5. The periphery of the coolant flow openings 5 may additionally or alternatively be sealed by other means such as, for example, elastic beading.

The shim 1 is terminated radially outwardly, relative to the edge of each of the openings 3, from the beads 7. Thus, the beads do not overlap the shim. In the typical situation, where the gasket is to be employed with an engine having a plurality of cylinders, the shim 1 will thus define a plurality of openings 9 which are coaxial with, but larger than, openings 3. Depending on the engine cylinder spacing, the edge regions of shim 1 which surround adjacent openings 9 may be shared, i.e., in the space between adjacent openings 9 the width of the planar edge regions surrounding each opening in the shim may be less than in the shim edge regions which are displaced therefrom by 90°. Except as discussed below in the description of FIGS. 3 and 4, the shim 1 will be planar.

A gasket in accordance with the invention also includes a ring member 10 which extends around each opening 3. Ring member 10 is provided, in the region adjoining the edge of each cylinder opening, with an inner deformation limiter 11. In the FIG. 2 embodiment, inner deformation limiter 11 is defined by a folded over edge portion of the ring member 10. It will be understood, however, that the inner deformation limiter 11 can be defined by a separate ring member affixed to the primary ring member 10.

The interior diameter of ring member 10 is selected to be substantially the same as the diameter of the opening 3. The external diameter of ring member 10 is selected such that an annular overlap 12 with the shim 1 is formed. This annular overlap, i.e., a region of increased internal thickness, defines the outer deformation limiter for the adjacent bead 7. Ring member 10 may be affixed to shim 1 by any suitable means such as, for example, by spot welding in the region of the overlap 12. The inner and outer deformation limiters cooperate to create a situation wherein spring compression of an intermediately located bead 7 is constrained to be in a direction which is substantially perpendicular with respect to the plane of the gasket. Likewise, in the case of engines having cylinder liners, any subsiding of the liner will not result in undue compression of, and thus damage to, the intervening bead 7.

It should be appreciated that the thickness of the sheet metal from which the shim 1 and the ring members 10 are formed does not have to be the same. Rather, the thickness of the shim and ring members can be adapted to the specific conditions of the engine with which the gasket is to be employed.

It will also be appreciated that the spacing between the engine cylinders may dictate that the ring members 10 be combined into a single element, having the general appearance of a series of attached rings, which is commensurate with the above-discussed shim member wherein the annular edge regions between adjacent openings 9 are shared.

Where the gasket employs a pair of cover plates 2, the inner and outer deformation limiters will be arranged symmetrically with respect thereto. In the case of a gasket having only a single cover plate 2, the inner and outer deformation limiters will extend in the same direction, i.e., toward the cover plate.

Figure 3:
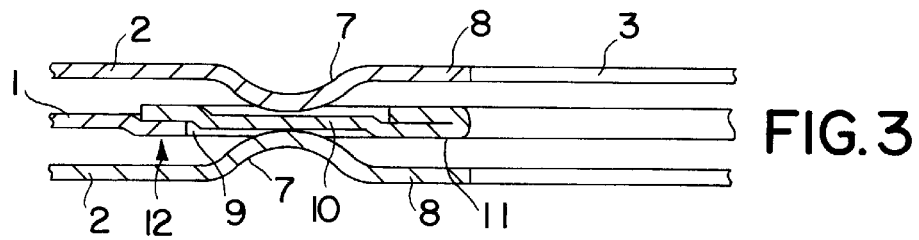
FIG. 3 is a view similar to FIG. 2 showing a second embodiment of a gasket in accordance with the invention.

In the embodiment of the invention depicted in FIG. 3, both the annular region of the shim 1 at the edge of each opening 9 and the edge regions of ring member 10 adjacent the inner and outer diameters thereof will be bent out of the planes of their respective shim member and ring member as shown. This shaping of the edge regions of the shim and ring member will place both deformation limiters centrally between the cover plates 2, thereby insuring that the deformation limiters will exert the same effect on the oppositely facing beads 7 of each cover plate.

Figure 4:
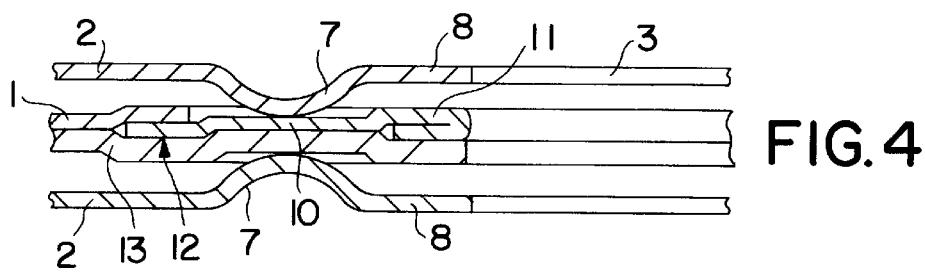
FIG. 4 is a view similar to FIG. 2 which depicts a third embodiment of a gasket in accordance with the invention.

FIG. 4 depicts a further embodiment of the invention wherein the thickness of the gasket is increased through the provision of a carrier plate 13. The carrier plate 13, as shown, will extend to the periphery of each of the openings 3 and will be shaped to accommodate the ring member(s). In the FIG. 4 embodiment, accordingly, the ring member is partly sandwiched between the shim 1 and the carrier plate 13. The FIG. 4 arrangement, as in the case of the above-described FIG. 3 embodiment, insures the positioning of the deformation limiters centrally between the two cover plates 2.

In all of the disclosed embodiments of the invention, the inner and/or outer deformation limiters can readily be provided with width profiling.

As will be obvious to those skilled in the art, proper positioning of the ring member(s) 10 during the manufacturing process is rendered particularly easy when the cooperating ring member and shim are shaped as depicted in FIGS. 3 and 4.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A metallic gasket comprising:

a shim member, said shim member being generally planar and being provided with at least a first circular opening, said shim member first opening having an axis which is generally transverse to the plane of said shim member, said shim member first opening having a first diameter, an annular edge region surrounding said first opening in said shim member;

at least a first cover plate, said first cover plate being generally planar and being provided with at least a first circular opening, said first cover plate first opening having an axis which is transverse to the plane of said first cover plate and coaxial with said shim member first opening, said first cover plate first opening having a second diameter which is less than said first diameter, said first cover plate being provided with a circular resilient bead, said bead extending outwardly from said first cover plate plane in the direction of the plane of said shim member, said resilient bead having a minimum diameter in the plane of said cover plate which is greater than said second diameter whereby said first cover plate has a planar edge region which extends between said resilient bead minimum diameter and said first cover plate first opening, said bead having a maximum diameter in the plane of said cover plate which is less than said first diameter of said shim member first opening whereby said bead does not overlap said shim member; and at least a first bead deformation limiting member, said deformation limiting member including a first ring having an inner diameter which is substantially equal to said second diameter said first ring inner diameter defining an opening which is coaxial with said first cover plate first opening and said shim member first opening, said first ring further having an outer diameter which exceeds said first diameter whereby a portion of said ring overlaps said shim member annular edge region, the combined thickness of said shim member and said ring in said overlapped ring portion defining a first deformation limiter for said cover plate bead, said first deformation limiter limiting the deformation of said bead, said deformation limiting member further including a second deformation limiter, said second deformation limiter being in registration with said cover plate planar edge region and limiting the deformation of said bead, said ring having a planar portion which extends between said first and second deformation limiters, said planar ring portion being in registration with said cover plate bead and being oriented parallelly with respect to the plane of said cover plate.

2. The gasket of claim 1 wherein said overlapping portions of said shim and said deformation limiting member first ring are bent out of the respective planes of said shim and said ring.

3. The gasket of claim 1 wherein said second deformation limiter is integral with said first ring.

4. The gasket of claim 3 wherein said second deformation limiter comprises a folded over portion of said ring.

5. The gasket of claim 3 wherein said overlapping portions of said shim and said ring are bent out of the respective planes of said shim and said ring.

6. The gasket of claim 4 wherein said overlapping portions of said shim and said ring are bent out of the respective planes of said shim and said ring.

7. The gasket of claim 1 wherein said first ring is fusion bonded to said shim in said overlapping portion thereof.

8. The gasket of claim 1 further comprising:
a second cover plate, said second cover plate being a mirror image of said first cover plate, said shim and deformation limiting members being disposed between said first and second cover plates, said resilient bead of said second cover plate being in registration with and directed toward said resilient bead of said first cover plate.

9. The gasket of claim 1 wherein said cover plate and said shim are each provided with a plurality of said first openings and at least two of said first openings of each of said cover plate and shim are adjacent, said two adjacent cover plate openings being coaxial with said two adjacent shim openings, and wherein said deformation limiting member, in a region between said adjacent openings, has a common planar section which cooperates with a pair of resilient beads which are arranged coaxially with respect to said two adjacent cover plate openings.

10. The gasket of claim 1 further comprising:
a carrier plate, said deformation limiting member being disposed in abutting relationship to said carrier plate, said carrier plate having an opening which is coaxial with and has the same diameter as said first opening in said cover plate.

11. The gasket of claim 1 wherein said shim and said deformation limiting member ring are formed of sheet metal and wherein the thickness of said shim is different from the thickness of said ring.

12. The gasket of claim 8 wherein said overlapping portions of said shim and said deformation limiting member ring are bent out of the respective planes of said shim and said ring.

13. The gasket of claim 8 wherein said second deformation limiter is integral with said ring.

14. The gasket of claim 8 wherein said deformation limiting member ring is fusion bonded to said shim in said overlapping portion thereof.

15. The gasket of claim 8 wherein said cover plate and said shim are each provided with a plurality of said first openings and at least two of said first openings of each of said cover plate and shim are adjacent, said two adjacent cover plate openings being coaxial with said two adjacent shim openings, and wherein said deformation limiting member, in a region between said adjacent openings, has a common planar section which cooperates with a pair of resilient beads which are arranged coaxially with respect to said two adjacent cover slate openings.

16. The gasket of claim 8 further comprising:
a carrier plate, said deformation limiting member being disposed in abutting relationship to said carrier plate, said carrier plate having an opening which is coaxial with and has the same diameter as said first opening in said cover plate.

17. The gasket of claim 15 wherein said overlapping portions of said shim and said deformation limiting member ring are bent out of the respective planes of said shim and said ring.

18. The gasket of claim 17 wherein said second deformation limiter is integral with said ring.

19. The gasket of claim 18 wherein said second deformation limiter comprises a folded over portion of said ring.

20. The gasket of claim 19 further comprising:
a carrier plate, said deformation limiting member being disposed in abutting relationship to said carrier plate, said carrier plate having an opening which is coaxial with and has the same diameter as said first opening in said cover plates.

* * * * *

UNITED STATES PATENT AND TRADEMARK OFFICE
CERTIFICATE OF CORRECTION

PATENT NO.   : 5,927,724
DATED        : July 27, 1999
INVENTOR(S)  : Maschmann et al.

It is certified that error appears in the above-identified patent and that said Letters Patent is hereby corrected as shown below:

Column 4,
Line 57, after "diameter" (first occurrence), insert -- , --.

Column 6,
Line 24, delete "slate" and insert -- plate --.

Signed and Sealed this

Ninth Day of July, 2002

Attest:

JAMES E. ROGAN
Attesting Officer    Director of the United States Patent and Trademark Office